United States Patent
Janis et al.

(10) Patent No.: US 10,064,197 B2
(45) Date of Patent: Aug. 28, 2018

(54) NETWORK ASSISTED INTERFERENCE SUPPRESSION

(71) Applicant: Nokia Technologies Oy, Espoo (FI)

(72) Inventors: Pekka Janis, Espoo (FI); Klaus Hugl, Vienna (AT)

(73) Assignee: Nokia Technologies Oy, Espoo (FI)

( * ) Notice: Subject to any disclaimer, the term of this patent is extended or adjusted under 35 U.S.C. 154(b) by 202 days.

(21) Appl. No.: 14/890,252

(22) PCT Filed: May 17, 2013

(86) PCT No.: PCT/IB2013/054067
§ 371 (c)(1),
(2) Date: Nov. 10, 2015

(87) PCT Pub. No.: WO2014/184619
PCT Pub. Date: Nov. 20, 2014

(65) Prior Publication Data
US 2016/0157243 A1 Jun. 2, 2016

(51) Int. Cl.
*H04W 72/08* (2009.01)
*H04W 72/04* (2009.01)
(Continued)

(52) U.S. Cl.
CPC ......... *H04W 72/082* (2013.01); *H04J 11/005* (2013.01); *H04J 11/0056* (2013.01);
(Continued)

(58) Field of Classification Search
None
See application file for complete search history.

(56) References Cited

U.S. PATENT DOCUMENTS

2013/0114534 A1 5/2013 Ji et al.
2013/0195051 A1* 8/2013 Koivisto ............... H04W 72/04
370/329

(Continued)

FOREIGN PATENT DOCUMENTS

EP 2280492 A1 2/2011
WO 2012018611 A1 2/2012

OTHER PUBLICATIONS

International Search Report and Written Opinion received for corresponding Patent Cooperation Treaty Application No. PCT/IB2013/054067, dated Jan. 24, 2014, 10 pages.

(Continued)

*Primary Examiner* — Jason E Mattis
*Assistant Examiner* — Hong Shao
(74) *Attorney, Agent, or Firm* — Harrington & Smith (57) ABSTRACT

The exemplary embodiments provide at least a method for receiving from a serving access node information of communications of at least one other access node, the information comprising interference conditions of at least one distributed enhanced physical downlink control channel set used by the at least one other access node, and the communications comprising transmissions from two or more antenna ports of the at least one other access node, estimating different interference conditions with respect to communications from different antenna ports of the two or more antenna ports based on the information; and using an enhanced receiver based on the estimated at least two different interference conditions. Further, the exemplary embodiments provide at least determining by a serving access node information of interference conditions of at least one distributed enhanced physical downlink control channel set used by at least one other access node; and sending towards user equipment the information.

20 Claims, 4 Drawing Sheets

(51) Int. Cl.
*H04J 11/00* (2006.01)
*H04L 25/02* (2006.01)
*H04L 5/00* (2006.01)

(52) U.S. Cl.
CPC ......... *H04W 72/042* (2013.01); *H04L 5/0091* (2013.01); *H04L 25/0204* (2013.01)

(56) References Cited

U.S. PATENT DOCUMENTS

2014/0301292 A1* 10/2014 Chen .................... H04L 5/0048
 370/329
2015/0382371 A1* 12/2015 Liu ........................ H04B 7/024
 370/329

OTHER PUBLICATIONS

Ye et al., "Enhanced Physical Downlink Control Channel in LTE Advanced Release 11", IEEE Communications Magazine, Feb. 2013, vol. 51, No. 2, 8 pages.

* cited by examiner

NETWORK ASSISTED INTERFERENCE SUPPRESSION

RELATED APPLICATION

This application was originally filed as Patent Cooperation Treaty Application No. PCT/IB2013/054067 filed May 17, 2013.

TECHNICAL FIELD

The teachings in accordance with the exemplary embodiments of this invention relate generally to network assisted interference suppression at user equipment and, more specifically, relate to network assisted enhanced physical downlink control channel interference suppression at user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
AP antenna port
CP cyclic prefix
DCI downlink control information
DIP dominant interferer proportion
DMRS demodulation reference signals
EPDCCH enhanced physical downlink control channel
eREG enhanced resource element group
IRC interference rejecting combining
MMSE minimum mean square error
PDSCH physical downlink shared channel
PRB physical resource block
RE resource element Enhanced physical downlink control channel (EPDCCH) has been specified in 3GPP LTE Release 11 in its technical specifications including, for example, TS 36.211 V11.2.0 Evolved Universal Terrestrial Radio Access (E-UTRA); Physical channels and modulation. The EPDCCH is a control channel that is frequency domain multiplexed with a physical downlink shared channel (PDSCH) at physical resource block (PRB) pair granularity. In 3GPP, a study item has been initiated that focuses on network assisted advanced user equipment (UE) receivers (interference cancelation). In that study, schemes where a network provides assistance to the UE such that better interference cancelation/suppression techniques are facilitated. The embodiments of the invention provide at least a novel method to provide improved interference cancelation/suppression techniques for user equipment.

SUMMARY

In an exemplary aspect of the invention, there is a method comprising: receiving from a serving access node, by a user equipment, information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node; estimating at least two different interference conditions with respect to communications from different antenna ports of the two or more antenna ports based on the information; and using an enhanced receiver based on the estimated at least two different interference conditions.

In an exemplary aspect of the invention, there is a computer readable medium encoded with a computer program executable by a processor to perform actions comprising: receiving from a serving access node, by a user equipment, information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node; estimating at least two different interference conditions with respect to communications from different antenna ports of the two or more antenna ports based on the information; and using an enhanced receiver based on the estimated at least two different interference conditions.

In an exemplary aspect of the invention, there is an apparatus comprising: at least one processor; and at least one memory including computer program code, where the at least one memory and the computer program code are configured, with the at least one processor, to cause the apparatus to at least: receive from a serving access node information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node; estimate at least two different interference conditions with respect to communications from different antenna ports of the two or more antenna ports based on the information; and using an enhanced receiver based on the estimated at least two different interference conditions.

In an exemplary aspect of the invention, there is an apparatus comprising: means for receiving from a serving access node, by a user equipment, information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node; means for estimating at least two different interference conditions with respect to communications from different antenna ports of the two or more antenna ports based on the information; and means for using an enhanced receiver based on the estimated at least two different interference conditions.

In accordance with the exemplary embodiments as described in the paragraph above the mean for receiving comprises an interface to a communication network, and where the means for estimating and using comprises a computer readable medium encoded with a computer program executable by a processor.

In an exemplary aspect of the invention, there is a method comprising: determining by a serving access node information of interference conditions of at least one distributed enhanced physical downlink control channel set used by at least one access node other than the serving access node; and sending towards a user equipment the information comprising the interference conditions of the at least one distributed enhanced physical downlink control channel set of the at least one access node other than the serving access node.

In another exemplary aspect of the invention, there is a computer readable medium encoded with a computer program executable by a processor to perform actions comprising: determining by a serving access node information of interference conditions of at least one distributed enhanced physical downlink control channel set used by at least one access node other than the serving access node; and sending towards a user equipment the information comprising the interference conditions of the at least one distributed enhanced physical downlink control channel set of the at least one access node other than the serving access node.

In an exemplary aspect of the invention, there is an apparatus comprising: at least one processor; and at least one memory including computer program code, where the at least one memory and the computer program code are configured, with the at least one processor, to cause the apparatus to at least: determine with a serving access node information of interference conditions of at least one distributed enhanced physical downlink control channel set used by at least one access node other than the serving access node; and send towards a user equipment the information comprising the interference conditions of the at least one distributed enhanced physical downlink control channel set of the at least one access node other than the serving access node.

In still another exemplary aspect of the invention, there is an apparatus comprising: means for determining by a serving access node information of interference conditions of at least one distributed enhanced physical downlink control channel set used by at least one access node other than the serving access node; and means for sending towards a user equipment the information comprising the interference conditions of the at least one distributed enhanced physical downlink control channel set of the at least one access node other than the serving access node.

In accordance with the exemplary aspect of the invention as described in the paragraph above the means for determining comprises a computer readable medium encoded with a computer program executable by a processor and where the mean for sending comprises an interface to a communication network

BRIEF DESCRIPTION OF THE DRAWINGS

The foregoing and other aspects of embodiments of this invention are made more evident in the following Detailed Description, when read in conjunction with the attached Drawing Figures, wherein.

3A and 3B illustrate an RE to eREG mapping of EPDCCH and a resulting port association in accordance with the exemplary embodiments of the invention.

DETAILED DESCRIPTION

A problem exists in that the UE cannot possibly know the PRB pairs over which the dominant interferer transmits localized/distributed EPDCCH or PDSCH. This lack of side information and the different spatial characteristics of the interference types lead to reduced gains from advanced interference aware receivers, such as for example IRC receivers. The embodiments of the invention address at least these issues.

It is noted that the EPDCCH includes a localized transmission mode and a distributed transmission mode. These modes are referenced as follows:

In the localized transmission mode, each UEs DCI is mapped to as few PRB pairs as possible in order to enable frequency domain scheduling gain for EPDCCH. Further, a single DM-RS antenna port is used for demodulation of the localized EPDCCH mode within a PRB pair, which further enables UE-specifically precoded DCI transmission to a UE resulting in "beamforming gain".

With regards to localized EPDCCH, a single DCI message is using a single precoded transmission on a PRB pair, while several, differently precoded DCIs might share the same EPDCCH PRB.

In the distributed transmission mode each UEs DCI is mapped to as many PRB pairs as possible (e.g., the full set of PRB pairs configured to the EPDCCH set whenever possible), which maximizes frequency diversity. All EPDCCH DCIs that are transmitted over the same distributed EPDCCH set share two common DMRS antenna ports. In case of normal cyclic prefix, antenna ports 107 and 109 for example are used whereas for extended CP antenna ports 107 and 108 are to be used. The resource elements (REs) that are used in distributed EPDCCH transmission are mapped to the two antenna ports in an alternating manner that is fixed in the specifications in Section 6.8. A.5 of 3GPP TS 36.211 V11.2.0.

In distributed EPDCCH the PRB pair is effectively split into two sets of REs, one set using antenna port 107 and the second set using antenna port 108/109 (for extended or normal CP), where different transmit precoding weights may be applied. Hence, the spatial interference structure arising from EPDCCH transmission is not constant across the full PRB pair.

Comparing these two EPDCCH modes, the distributed EPDCCH mode may be considered for usage when maximum reliability is sought for. This can be for a reason that required control channel reliability can be easier accomplished by using spatial (TX) diversity combined with frequency diversity of the distributed mode. Moreover, larger aggregation levels are possible for distributed EPDCCH compared to localized EPDCCH TX mode, additionally increasing the downlink control channel reliability.

The EPDCCH is a control channel that is frequency domain multiplexed with the physical downlink shared channel (PDSCH) on the physical resource block (PRB) pair granularity. The PRB pairs used for EPDCCH transmission are specifically configured for user equipment (UE), and may occur on different portions of the band in different cells.

The EPDCCH has two operation modes, denoted as "Localized EPDCCH transmission" and "Distributed EPDCCH transmission", respectively. The EPDCCH transmission modes may change the spatial properties of the interference seen at the UEs. For example, the PDSCH in DMRS based transmission mode TM9 is precoded such that all REs in a given PRB pair (or, in some cases, several PRB pairs) are precoded using the same transmit precoding weights. Hence, the interference from such PDSCH transmission has the same spatial structure across the full PRB pair. The same does not apply to EPDCCH, however. In case of localized EPDCCH, a single DCI message is using a single precoded transmission on a PRB pair—but several, differently precoded DCIs might share the same EPDCCH PRB. In distributed EPDCCH the PRB pair is effectively split into two sets of REs, one set using antenna port 107 and the second set using antenna port 108/109 (for extended or normal CP), where different transmit precoding weights may be applied according to Section 6.8. A.5 of 3GPP TS 36.211V11.2.0. Hence, the spatial interference structure arising from EPDCCH transmission is not constant across the full PRB pair.

New UE performance requirements for PDSCH demodulation have also been specified in 3GPP Rel. 11. These requirements assume that the UEs (equipped with multiple receive antennas) are able to estimate the spatial covariance of the interference that they are experiencing. The knowledge of the interference spatial covariance can be utilized in forming linear receiver weights that suppress the interference, thus providing significant performance gain. The Release 11 advanced receiver requirements can be met by employing interference rejection combining (IRC) receivers, without any extra side information from the network side. Further, a 3GPP study item has been initiated that focuses on network assisted advanced UE receivers (interference cancelation). That study item's scope is based on schemes where the network provides assistance to the UE such that better interference cancelation/suppression techniques are facilitated.

Figure 1:
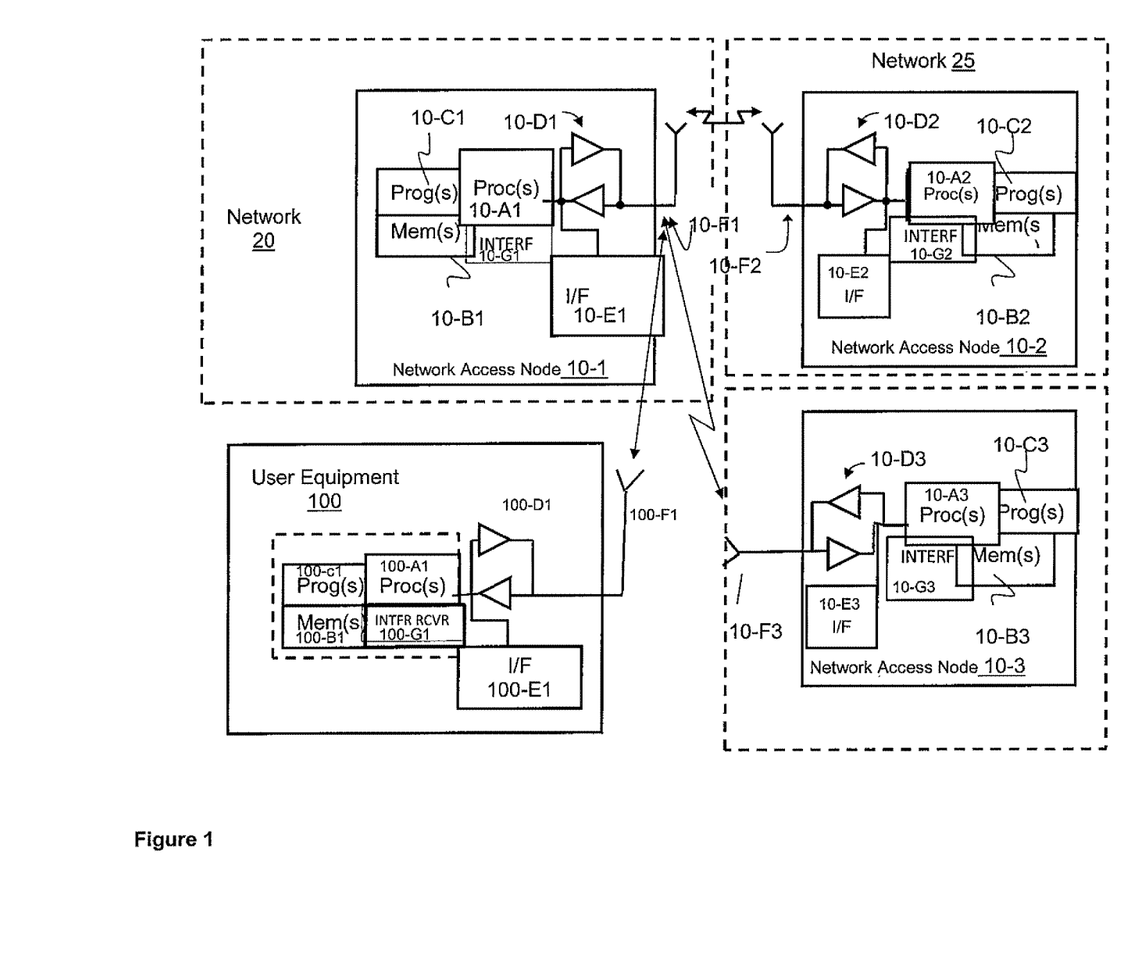
FIG. 1 is a simplified block diagram of various devices suitable for use in practicing the exemplary embodiments of the invention.

Before discussing the invention in detail reference will be made to FIG. 1. FIG. 1 illustrates an overview of one environment where the exemplary embodiments of the invention interference suppression may be practiced. FIG. 1 is a block diagram having a number of network access nodes 10 communicating in a network 200. The network 200 can include wireless/wired networks and more than one cell. The network 200 includes network access nodes 10-1, 10-2, and 10-3, in wireless and/or wired communication. The network access node 10-1 includes one or more processors 10-A1, one or more memories 10-B1 containing one or more programs 10-C1, a radio frequency transceiver 10-D1 able to receive and transmit data, an interface 10-E1, and one or more antennas 10-F1. Similarly, the network access node 10-2 includes one or more processors 10-A2, one or more memories 10-B2 containing one or more programs 10-C2, a radio frequency transceiver 10-D2 able to receive and transmit data, an interface 10-E2, and one or more antennas 10-F2. In the example of FIG. 1, the network access node 10-3 includes one or more processors 10-A3, one or more memories 10-B3 containing one or more programs 10-C3, an interface 10-E3, and one or more antennas 10-F3. It is noted that any of the interfaces 10-E1, 10-E2, and 10-E3 can comprise at least one of or a combination of a wired and/or wireless interface. The wireless interface may be referred to as an air interface. In addition, any of these interfaces can be configured to provide a wired, wireless, and/or backhaul connection interface.

In addition, the network access nodes 10-1, 10-2, and 10-3 can each include an interference suppression processor (INTERF) 10-G1, 10-G2 and 10-G3, respectively, to perform the operations in accordance with the exemplary embodiments of the invention. For instance, the network access nodes 10-1, 10-2, and 10-3 could each be a base station which is/are transmitting and/or receiving information comprising interference conditions in accordance with the invention.

The user equipment 100 as in FIG. 1 includes one or more processors 100-A1 one or more memories 100-B1 containing one or more programs 100-C1, a radio frequency transceiver 100-D1 able to receive and transmit data, an interface 100-E1, and one or more antennas 100-F1. The interface 100-E1 is configured to operate as a wireless interface, also referred to as an air interface for communication with the network. Further, the user equipment 100 also includes an interference suppression receiver processor (INTFR RCVR) 100-G1. In accordance with the exemplary embodiments of the invention, the INTFR RCVR processor 100-G1 is configured to at least utilize signaling information to estimate interference conditions and to form a suppressing/cancelling receiver at the user equipment 100 based on information of interference conditions received. The processor 100-G1 can be used to perform the novel interference suppression or cancelation operations as described herein. The user equipment 100 can be mobile equipment such as a cellular phone or other cellular device, and the network access node 10-1 could be a serving access node network of a cell where the user equipment 100 is located. Further, as illustrated there may be a wired and/or wireless connections established between any of the network node network access nodes 10-1, 10-2, and 10-3. Any of these connections may be used for communications in accordance with the exemplary embodiments of the invention.

As shown in FIG. 1, there exist several interconnections between the network parts shown by corresponding arrows or lines. These interconnections maybe established by means of interfaces or reference points which may be different in dependence of the employed network technology and which are known to those skilled in the art.

In accordance with the exemplary embodiments of the invention, the network access nodes 10-2, and 10-3 can transmit an indication of interference in a channel, such as an EPDCCH and/or PDSCH channel. The serving network access node 10-1 can receive these indications of interference and transmit information regarding these indications of interference to the user equipment 100 via its interface 10-E1. Similarly, in accordance with the exemplary embodiments, the user equipment 100 can receive these indications of interference via its interface 100-E over the one or more antennas 100-F1. The user equipment 100 can use these indications to at least form and implement suppressing/cancelling receiver(s) in accordance with the embodiments of the invention.

According to the present invention, the network provides assistance to the UEs which enables the UE to implement PRB pair specific interference suppressing receivers taking into account a potential interfering distributed EPDCCH. In here, the specific structure of the distributed EPDCCH, as the main EPDCCH operation mode, is taken into account.

Figure 2A:
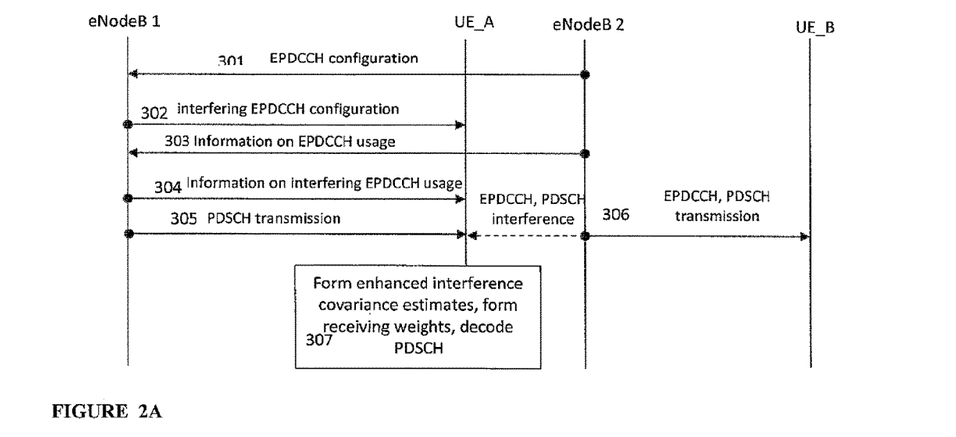
FIGS. 2A and 2B each illustrate a communication flow chart of a method in accordance with the exemplary embodiments of the invention.
Figure 2B:
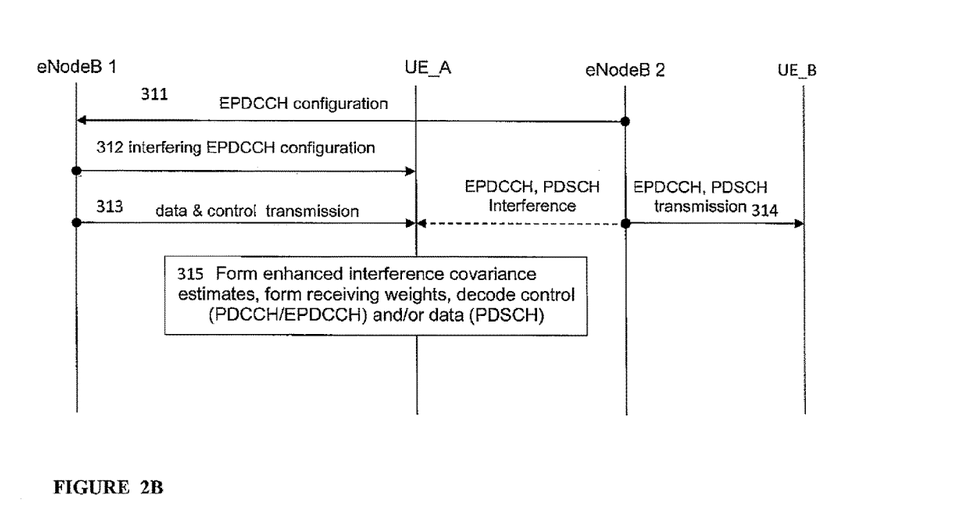

Each PRB pair may be then potentially demodulated using e.g. an IRC receiver that is specifically tailored to suppressing distributed EPDCCH or PDSCH type of interference according to the dominant interferer transmissions. The network signals semi statically the distributed EPDCCH configuration(s) applied in the neighboring cells/transmission points. This side information is then used at the UE so that proper interference covariance estimation and receiver algorithm can be chosen. Furthermore, a dynamic indication may be included in the downlink scheduling DCI, which indicates whether a specific interfering EPDCCH set configuration is in use at a given time, i.e. in a given subframe or not. The invention may be applied for enhancing the demodulation performance of both EPDCCH and PDSCH, i.e. on channels that might face neighbor cell EPDCCH interference The exemplary embodiments of the invention provide at least:
  Information transmitted to UE in order to suppress distributed EPDCCH type of interference according to the dominant interferer transmissions;
  network signals semi statically the distributed EPDCCH configuration(s) applied in the neighboring cells/transmission points;
  a dynamic indication may be included in the downlink scheduling DCI, that indicates whether a specific interfering EPDCCH set configuration is in use in a given subframe
  UE may use the received information to choose proper interference estimation (including for example the spatial structure given by the spatial covariance) and receiver algorithm operation;
  UE may calculate/estimate two different interference conditions, one with respect to AP 107 and the other for AP 108/109 of an interfering distributed EPDCCH, in case the signaling indicated the interfering distributed EPDCCH is present;
  These two interference conditions may be applied for the specific REs when calculating the MMSE-IRC receiver weights or any other kind of interference aware receiver structure and for soft-bit weighting for REs interfered by a precoded transmission from AP 107 and 108/109 of the interfering EPDCCH respectively;

FIGS. 2A and 2B basically show the configurations that need to be done by the network in order for the UE to know the location of a distributed EPDCCH and to know where the interfering EPDCCH is located in the neighbor cell/interfering transmission point. The serving access node, also called eNB or base station (BS) would need to know the configuration in the neighbor cell/interfering eNB in order to be able to inform the UE about the interference as such.

FIG. 2A is a flow chart according to the embodiments of the invention, which is applied for enhancing the data channel demodulation performance. As illustrated in FIG. 2A, at step 301 an access node eNodeB2 sends information related to EPDCCH set configuration(s) to a serving access node eNodeB1. At step 302 the serving access node eNodeB1 sends information including information related to interfering EPDCCH set configuration(s) to the UE_A. At step 303 an access node eNodeB2 sends information to a serving access node eNodeB1 on whether the eNodeB2 actually transmits EPDCCH on the PRB pairs associated with the configured EPDCCH set(s). At step 304, the serving access node eNodeB1 sends information of interfering distributed EPDCCH dynamic signaling as part of the downlink control information (DCI) signaling to the UE_A if the eNodeB2 is actually using the configured EPDCCH set. At step 305 the serving access node eNodeB1 transmits the desired PDSCH channel to the UE_A. At the same time in step 306 the interfering access node eNodeB2 transmits EPDCCH and/or PDSCH to another user equipment UE_B, which is perceived as interference at the UE_A as indicated by the dashed line. Then at step 307 the UE_A uses the received information to form enhanced interference covariance estimates, form receiving weights, and use these to demodulate/decode the PDSCH. For example the UE_A may estimate interference characteristics using the received information and perform operations including antenna port to RE mapping as will be described in more detail below.

FIG. 2B illustrates a flow chart according to the embodiments of the invention that is applied for enhancing the control or data channel decoding performance when dynamic signaling of the usage of interfering distributed EPDCCH is not to be utilized. As illustrated in FIG. 2B, at step 311 an access node eNodeB2 sends information related to its distributed EPDCCH set configuration(s) to a serving access node eNodeB1. At step 312 the serving access node eNodeB1 sends information including information related to interfering EPDCCH configuration(s) to the UE_A. At step 313 the serving access node eNodeB1 transmits data to the UE_A including data channels (PDSCH) and control channels (PDCCH or EPDCCH). At the same time at step 314, EPDCCH and PDSCH is transmitted by eNodeB2 to another user equipment UE_B and is received as interference by the UE_A as indicated by the dashed line. Then at step 315 the UE uses the received information to enhance the demodulation performance. In other words, the UE uses the information for enhanced data or control channel decoding, through for example forming enhanced interference covariance estimates and/or forming receiving weights.

We now consider how the specific structure of the distributed EPDCCH can be taken into account for the purpose of advanced receiver operation. As mentioned above, basically the REs of a distributed EPDCCH in a PRB pair can be either characterized by the spatial properties given by a DM-RS AP 107 or 108/109, as an example. Therefore, with an MMSE-IRC receiver the UE may calculate and estimate two different interference conditions, one with respect to AP 107 and the other for AP 108/109. These two interference conditions are then to be applied for the specific REs when calculating the MMSE-IRC receiver weights and/or for soft-bit weighting for REs interfered by a precoded transmission from AP 107 and 108/109 respectively.

As an example receiver type that could take advantage of the provided network assistance on the interfering distributed EPDCCH, we consider the MMSE-IRC receiver according to 3GPP 36829-b10 v11.1.0. This example receiver can suppress not only intra-cell interference but also the inter-cell interference when the degrees of freedom at the receiver are sufficient, i.e., the number of receiver antennas is higher than that of the number of desired data streams, and in MMSE IRC receiver weight matrix algorithms used can be expressed as follow:

$$W_{RX,1}(k,l) = \hat{H}_1^H(k,l) R^{-1}$$

where $\hat{H}_j(k,l)$ and R denote the estimated channel matrix and covariance matrix, respectively.

To obtain the MMSE-IRC receiver weight matrix, the covariance matrix including the sources of inter-cell interference needs to be estimated. Various schemes can be considered for that purpose.

1. CRS based covariance matrix estimation scheme
  The covariance matrix may be estimated at CRS REs by following equations $$R = P_1 \hat{H}_1(k,l) \hat{H}_1^H(k,l) + \frac{1}{N_{sp}} \sum_{k,l \in CRS} \tilde{r}(k,l) \tilde{r}(k,l)^H,$$

$$\tilde{r}(k,l) = r(k,l) - \hat{H}_1(k,l) d_1(k,l),$$

where $P_1$ is the transmission power of the serving cell and is equal to $E[|d_1(k,l)|^2]$ and $N_{sp}$ is the number of sampling REs, respectively.

2. DM-RS based covariance matrix estimation scheme (applicable when DM-RS are configured)

The covariance matrix may be estimated at DM-RS REs by following equations:

$$R = P_1 \hat{H}_1(k,l)\hat{H}_1^H(k,l) + \frac{1}{N_{sp}} \sum_{k,l \in DM-RS} \tilde{r}(k,l)\tilde{r}(k,l)^H,$$

$$\tilde{r}(k,l) = r(k,l) - \hat{H}_1(k,l)d_1(k,l)$$

3. Data signal based covariance matrix estimation scheme

The covariance matrix maybe estimated at PDSCH REs by following equations:

$$R = \frac{1}{N_{sp}} \sum_{k,l \in PDSCH, DM-RS} r(k,l)r(k,l)^H$$

Figure 3A:
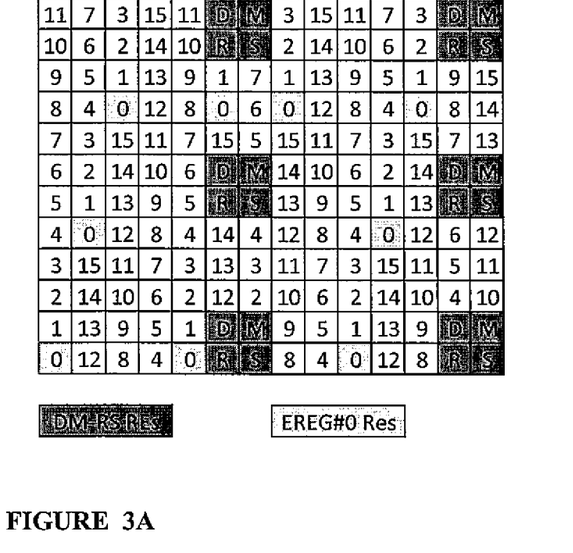
Figure 3B:
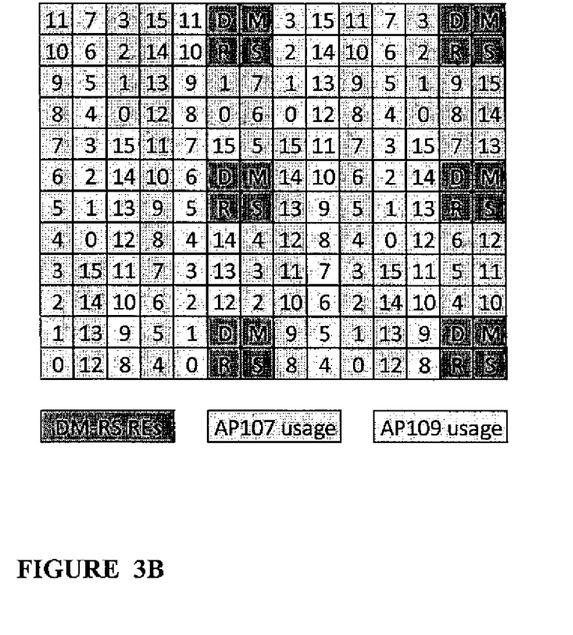

According to 3GPP TS 36.211 in Sec. 6.8A.5, the antenna port 107 and 108/109 should be alternatingly used within an eREG for precoding purposes. Taking for example a normal CP, we illustrate the eREG to RE mapping in FIG. 3A and the resulting antenna port association for distributed EPDCCH in FIG. 3B. As illustrated in FIGS. 3A and 3B there is an RE to eREG mapping of EPDCCH (FIG. 3A) and the resulting antenna port association (FIG. 3B). A similar situation exists also for an extended CP, but only two antenna ports are available and the alternating antenna port usage within an eREG is between antenna port 107 and 108 (but again, starting with antenna port 107 within an eREG).

So the receiving UE will first create two estimates of the spatial interference—one which applies for transmission from antenna port 107 (i.e. spatial interference estimate I107) and one for the second antenna port (i.e. spatial interference estimate I108 or I109) and use the respective interference estimate for REs interfered by EPDCCH REs using AP107 or AP 108/109 respectively. As the antenna port usage for the distributed EPDCCH is fixed as such, the knowledge of the EPDCCH PRB pair alone will be sufficient to be able apply the correct interference term in the reception process of each RE and the following decoding process, as indicated in FIG. 3b by the two sets of REs—one use AP107 and one use AP109.

The interference estimates I107 and I108/109 may be obtained at the UE in several foreseeable ways. In the following, we give non-limiting examples that could be potentially utilized in conjunction with this invention. When demodulating PDSCH, the UE may estimate the interference characteristics from the REs that contain the PDSCH DMRS ports. In case normal CP is applied, and the rank of the intended PDSCH reception is at least 3, the UE may subtract the estimated received PDSCH DMRS symbols and estimate the interference characteristics as the sample covariance of the residual. I107 may be estimated from the REs that contain the DMRS port 7 of the PDSCH, and I109 may be estimated from the REs that contain the DMRS port 9 of the PDSCH.

When demodulating localized or distributed EPDCCH and trying to suppress some neighbor cell distributed EPDCCH, the sample covariance on DM-RS REs of the residual signal after the subtraction of the estimated received DMRS signal maybe used, to estimate the interference of the neighbor cell EPDCCH antenna ports. This method is also applicable to the normal CP, as the desired transmission reference signals utilize the full set of antenna ports {107, 109}. The interference characteristics may be in some implementations estimated utilizing in addition the CRS, equally well applicable for PDSCH or EPDCCH to be demodulated.

When either EPDCCH or PDSCH is demodulated for normal or extended CP, the interference characteristics of the neighbor cell distributed EPDCCH may be estimated as the sample covariance matrix of the received signal on the REs that carry the EPDCCH or PDSCH (correspondingly). In this case, based on the signaled presence of distributed EPDCCH type of interference, the UE may form different sample covariance matrices for the two sets of REs in the PRB pair.

Alternatively to the above mentioned methods, the network may signal the DMRS sequence initialization of the neighbor cell distributed EPDCCH (in addition the PRB pairs) to the UE. The UE may then estimate the interference covariance of the distributed EPDCCH interference through e.g. directly estimating the channel of the distributed EPDCCH antenna ports {107,109} or {107,108}. This method is applicable to PDSCH and EPDCCH demodulation, as well as to normal and extended CP.

The interference estimates may be utilized in the soft bit weighting of the decoding process of data or control channels. The weighting may be applied to take into account the different reliability of the soft bits that are interfered by the two different interference structures of distributed EPDCCH. Such soft bit weighting may be applied irrespective of whether an interference suppressing/cancelling receiver such as the minimum mean square error receiver is applied or not applied.

Figure 4A:
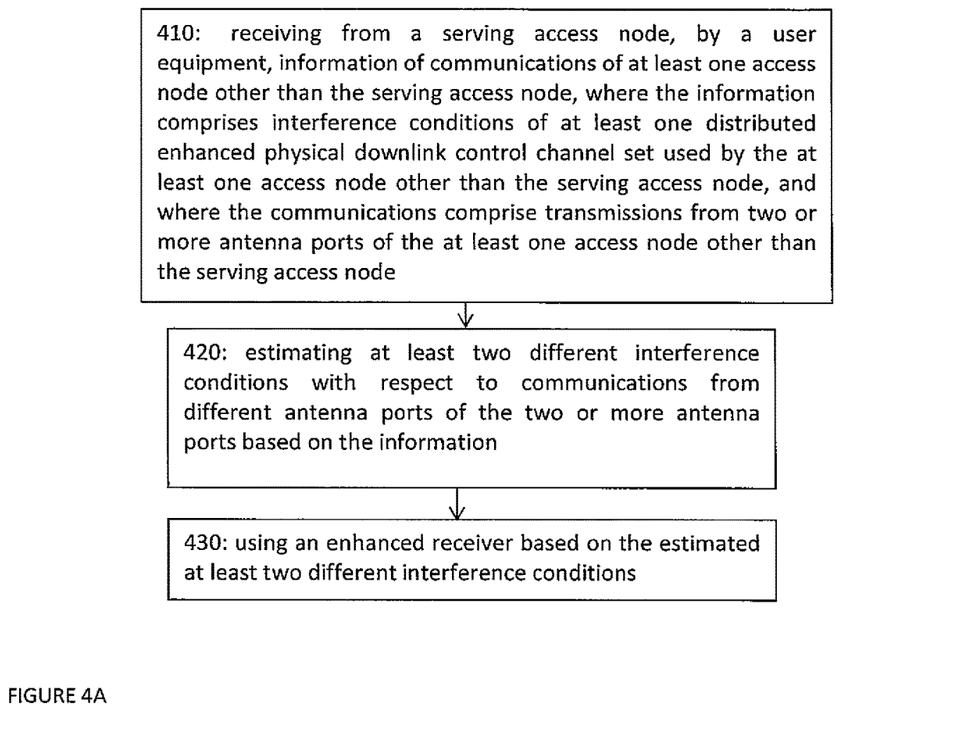
FIGS. 4A and 4B each illustrate a block diagram describing a method in accordance with the exemplary embodiments of the invention.

In accordance with an exemplary aspect of the invention as illustrated in FIG. 4A there is at least a method, apparatus, and executable computer program to perform actions as in step 410 of receiving from a serving access node, by a user equipment, information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node. In step 420 there is estimating at least two different interference conditions with respect to communications from different antenna ports of the two or more antenna ports based on the information. Then in step 430 there is using an enhanced receiver based on the estimated at least two different interference conditions.

In accordance with the exemplary embodiments as described in the paragraph above, the enhanced receiver comprises a minimum mean square error interference rejection combining receiver.

In accordance with the exemplary embodiments as described in the paragraphs above, the enhanced receiver comprises soft bit weighting that utilizes the information comprising interference conditions of at least one distributed enhanced physical downlink control channel set.

In accordance with the exemplary embodiments as described in the paragraphs above, there is calculating receiver weights for specific resource elements based on the estimated at least two different interference conditions; and applying in the enhanced receiver the receiver weights to the specific resource elements interfered by the different antenna ports.

In accordance with the exemplary embodiments as described in the paragraph above, the receiver weights are calculated based on interference covariance estimation and a receiver algorithm.

In accordance with the exemplary embodiments as described in the paragraphs above, the information comprises configuration information of the interfering distributed enhanced physical downlink control channel set of the at least one access node other than the serving access node.

In accordance with the exemplary embodiments as described in the paragraphs above, the information comprises downlink control information and the down link control information comprises an indication of whether the interfering distributed enhanced physical downlink control channel is in use in a given time instance of the communications.

In accordance with the exemplary embodiments as described in the paragraphs above, the information is sent to the serving access node from the at least one access node other than the serving access node.

Figure 4B:
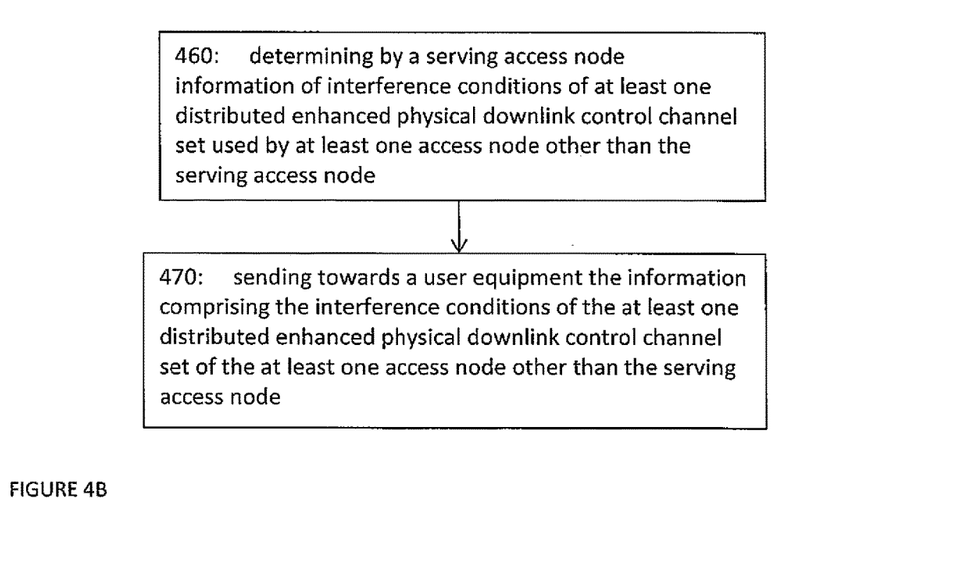

In accordance with an exemplary aspect of the invention as illustrated in FIG. 4B there is at least a method, apparatus, and executable computer program to perform actions as in step 460 of receiving In accordance with an exemplary aspect of the invention as illustrated in FIG. 4B there is at least a method, apparatus, and executable computer program to perform actions as in step 460 of determining by a serving access node information of interference conditions of at least one distributed enhanced physical downlink control channel set used by at least one access node other than the serving access node. Then in step 470 there is sending towards a user equipment the information comprising the interference conditions of the at least one distributed enhanced physical downlink control channel set of the at least one access node other than the serving access node.

In accordance with the exemplary embodiments as described in the paragraph above the determining is based on communications received by the serving access node from the at least one access node other than the serving access node.

In accordance with the exemplary embodiments as described in the paragraphs above the information sent to the user equipment is for use in an enhanced receiver at the user equipment.

In accordance with the exemplary embodiments as described in the paragraphs above the enhanced receiver at the user equipment comprises a minimum mean square error interference rejection combining receiver.

In general, the various embodiments of the user equipment can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The embodiments of this invention may be implemented by computer software executable by a data processor of the user equipment 100, such as the processor 100-*a*1, or by hardware, or by a combination of software and hardware. Further in this regard it should be noted that the various blocks of the logic flow diagram of FIGS. 2A, 2B, 4A and/or 4B may represent program steps, or interconnected logic circuits, blocks and functions, or a combination of program steps and logic circuits, blocks and functions. It is noted that any of these devices may have multiple processors (e.g. RF, baseband, imaging, user interface) which operate in a slave relation to a master processor. The teachings may be implemented in any single one or combination of those multiple processors.

In addition, the exemplary embodiments of the invention as at least described and illustrated with regards to FIG. 1 can provide the means for performing at least the exemplary embodiments of the invention as described above.

At least the memories 10-B1, 10-B2, 10-B3, and 100-B1 may be of any type suitable to the local technical environment and may be implemented using any suitable data storage technology, such as semiconductor-based memory devices, magnetic memory devices and systems, optical memory devices and systems, fixed memory and removable memory. At least the data processors 10-A1, 10-A2, 10-A3, and 100-A1 may be of any type suitable to the local technical environment, and may include one or more of general purpose computers, special purpose computers, microprocessors, digital signal processors (DSPs) and processors based on multi-core processor architecture, as non-limiting examples.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions maybe practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus comprising:
   at least one processor; and
   at least one memory including computer program code, where the at least one memory and the computer program code are configured, with the at least one processor, to cause the apparatus to at least:
   receive, at a user equipment, from a serving access node information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node;
   estimate, at the user equipment, at least two different interference conditions with respect to communications from different antenna ports of the two or more antenna ports based on the information;
   based on the estimated at least two different interference conditions, configure, by the user equipment, an enhanced receiver to at least suppress interference; and
   use, by the user equipment, the enhanced receiver to receive data, where the enhanced receiver comprises soft bit weighting that utilizes the information comprising interference conditions of at least one distributed enhanced physical downlink control channel set.

2. The apparatus according to claim 1, where the enhanced receiver comprises a minimum mean square error interference rejection combining receiver.

3. The apparatus according to claim 1, where the at least one memory including the computer program code is configured with the at least one processor to cause the apparatus to:
   calculate receiver weights for specific resource elements based on the estimated at least two different interference conditions; and
   apply in the enhanced receiver the receiver weights to the specific resource elements interfered by at least one of the different antenna ports.

4. The apparatus according to claim 3, where the receiver weights are calculated based on interference covariance estimation and a receiver algorithm.

5. The apparatus according to claim 1, where the information comprises configuration information of the interfering distributed enhanced physical downlink control channel set of the at least one access node other than the serving access node.

6. The apparatus according to claim 5, where the information is sent to the serving access node from the at least one access node other than the serving access node.

7. The apparatus according to claim 1, where the information comprises downlink control information and the down link control information comprises an indication of whether the interfering distributed enhanced physical downlink control channel is in use in a given time instance of the communications.

8. A method comprising:
   receiving, at a user equipment, from a serving access node, by a user equipment, information of communications of at least one access node other than the serving access node, where the information comprises interference conditions of at least one distributed enhanced physical downlink control channel set used by the at least one access node other than the serving access node, and where the communications comprise transmissions from two or more antenna ports of the at least one access node other than the serving access node;
   estimating, by the user equipment, at least two different interference conditions with respect to communications from different antenna ports, of the two or more antenna ports based on the information;
   based on the estimated at least two different interference conditions, configuring, by the user equipment, an enhanced receiver to at least suppress interference; and
   using, by the user equipment, an enhanced receiver to receive data, where the enhanced receiver comprises soft bit weighting that utilizes the information comprising interference conditions of at least one distributed enhanced physical downlink control channel set.

9. The method according to claim 8, where the enhanced receiver comprises a minimum mean square error interference rejection combining receiver.

10. The method according to claim 8, further comprising:
    calculating receiver weights for specific resource elements based on the estimated at least two different interference conditions; and
    applying in the enhanced receiver the receiver weights to the specific resource elements interfered by at least one of the different antenna ports.

11. An apparatus comprising:
    at least one processor; and
    at least one memory including computer program code, where the at least one memory and the computer program code are configured, with the at least one processor, to cause the apparatus to at least:
    determine, at a serving access node information of estimated interference conditions of at least one distributed enhanced physical downlink control channel set used by at least one access node other than the serving access node; and
    send towards a user equipment the information comprising the interference conditions of the at least one distributed enhanced physical downlink control channel set of the at least one access node other than the serving access node, where the information sent to the user equipment is for use in an enhanced receiver at the user equipment, where the enhanced receiver comprises soft bit weighting that utilizes the information comprising interference conditions of at least one distributed enhanced physical downlink control channel set.

12. The apparatus according to claim 11, where the determining is based on communications received by the serving access node from the at least one access node other than the serving access node.

13. The apparatus according to claim 11, where the enhanced receiver at the user equipment comprises a minimum mean square error interference rejection combining receiver.

14. A method comprising:
  determining by a serving access node information of interference conditions of at least one distributed enhanced physical downlink control channel set used by at least one access node other than the serving access node; and
  sending towards a user equipment the information comprising the interference conditions of the at least one distributed enhanced physical downlink control channel set of the at least one access node other than the serving access node, wherein the information sent to the user equipment is for use in an enhanced receiver at the user equipment, where the enhanced receiver comprises soft bit weighting that utilizes the information comprising interference conditions of at least one distributed enhanced physical downlink control channel set.

15. The method of claim 14, where the determining is based on communications received by the serving access node from the at least one access node other than the serving access node.

16. The method according to claim 14, where the enhanced receiver at the user equipment comprises a minimum mean square error interference rejection combining receiver.

17. The method according to claim 8, comprising:
  calculating receiver weights for specific resource elements based on the estimated at least two different interference conditions; and
  applying in the enhanced receiver the receiver weights to the specific resource elements interfered by at least one of the different antenna ports,
  where the receiver weights are calculated based on interference covariance estimation and a receiver algorithm.

18. The method according to claim 8, where the information comprises configuration information of the interfering distributed enhanced physical downlink control channel set of the at least one access node other than the serving access node.

19. The method according to claim 8, where the information is sent to the serving access node from the at least one access node other than the serving access node.

20. The method according to claim 8, where the information comprises downlink control information and the down link control information comprises an indication of whether the interfering distributed enhanced physical downlink control channel is in use in a given time instance of the communications.

* * * * *